(12) United States Patent
Sweeney et al.

(10) Patent No.: US 7,978,402 B2
(45) Date of Patent: Jul. 12, 2011

(54) ROBUST WINDOW FOR INFRARED ENERGY

(75) Inventors: Sean Michael Sweeney, Schenectady, NY (US); Timothy James Yosenick, Glenville, NY (US); Dalong Zhong, Niskayuna, NY (US); Milivoj Konstantin Brun, Ballston Lake, NY (US); Sergio Paulo Martins Loureiro, Saratoga Springs, NY (US); Venkat Subramaniam Venkataramani, Clifton Park, NY (US); Mohan Manoharan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 821 days.

(21) Appl. No.: 11/769,913

(22) Filed: Jun. 28, 2007

(65) Prior Publication Data

US 2010/0027105 A1     Feb. 4, 2010

(51) Int. Cl.
*G02B 5/08* (2006.01)

(52) U.S. Cl. .......................................... 359/350; 359/599

(58) Field of Classification Search ................... 359/599, 359/350–361, 577–590

See application file for complete search history.

(56) References Cited

U.S. PATENT DOCUMENTS

| | | | | |
|---|---|---|---|---|
| 6,417,831 B2 * | 7/2002 | Kashima | | 345/102 |
| 6,556,347 B1 * | 4/2003 | Murayama et al. | | 359/453 |
| 6,572,961 B1 * | 6/2003 | Koyama et al. | | 428/323 |
| 6,890,590 B2 * | 5/2005 | Lin et al. | | 427/164 |

OTHER PUBLICATIONS

Apetz et al., "Transparent Alumina: A Light-Scattering Model", Journal of the American Ceramic Society, vol. 86, No. 3, pp. 480-486, 2003.
Gorny et al., "Microstructure-Property Relationship in B4C-BetaSiC Materials", Solid State Ionics, vols. 101-103, pp. 953-958, 1997.
Harris, "Frontiers in Infrared Window and Dome Materials", SPIE, vol. 2552, pp. 325-335, 1995.
Harris, "Properties of Diamond for Window and Dome Applications", SPIE, vol. 2286, pp. 218-228, 1994.
Ikesue et al., "Synthesis and Performance of Advanced Ceramic Lasers", Journal of the American Ceramic Society, vol. 00, No. 0, pp. 1-9, 2006.
Krell, "Fracture Origin and Strength in Advanced Pressureless-Sintered Alumina", Journal of the American Ceramic Society, vol. 81, No. 7, pp. 1900-1906, Jul. 1998.
Krell et al., "Transparent Sintered Corundum With High Hardness and Strength", Journal of the American Ceramic Society, vol. 86, No. 1, pp. 12-18, Jan. 2003.
Lim et al., "Minimisation of Intrinsic Stress in Titanium Nitride Using a Cathodic Arc With Plasma Immersion Ion Implantation", Surface and Coatings Technology, vols. 174-175, pp. 76-80, 2003.

(Continued)

*Primary Examiner* — Thong Nguyen
(74) *Attorney, Agent, or Firm* — Paul J. DiConza

(57) ABSTRACT

Articles transparent to infrared radiation and resistant to impact and wear are provided. The article comprises a substrate and a composite coating disposed over the substrate and extending from an interface with the substrate to an external surface. The composite coating comprises a first phase and a second phase. The second phase has a higher resistance to erosive wear than the first phase. The coating comprises a compositional gradient proceeding from a first composition at the interface of the coating with the substrate to a second composition at the external surface, the first composition comprising a higher concentration of the first phase than that of the second composition.

23 Claims, 2 Drawing Sheets

OTHER PUBLICATIONS

Figure 1:
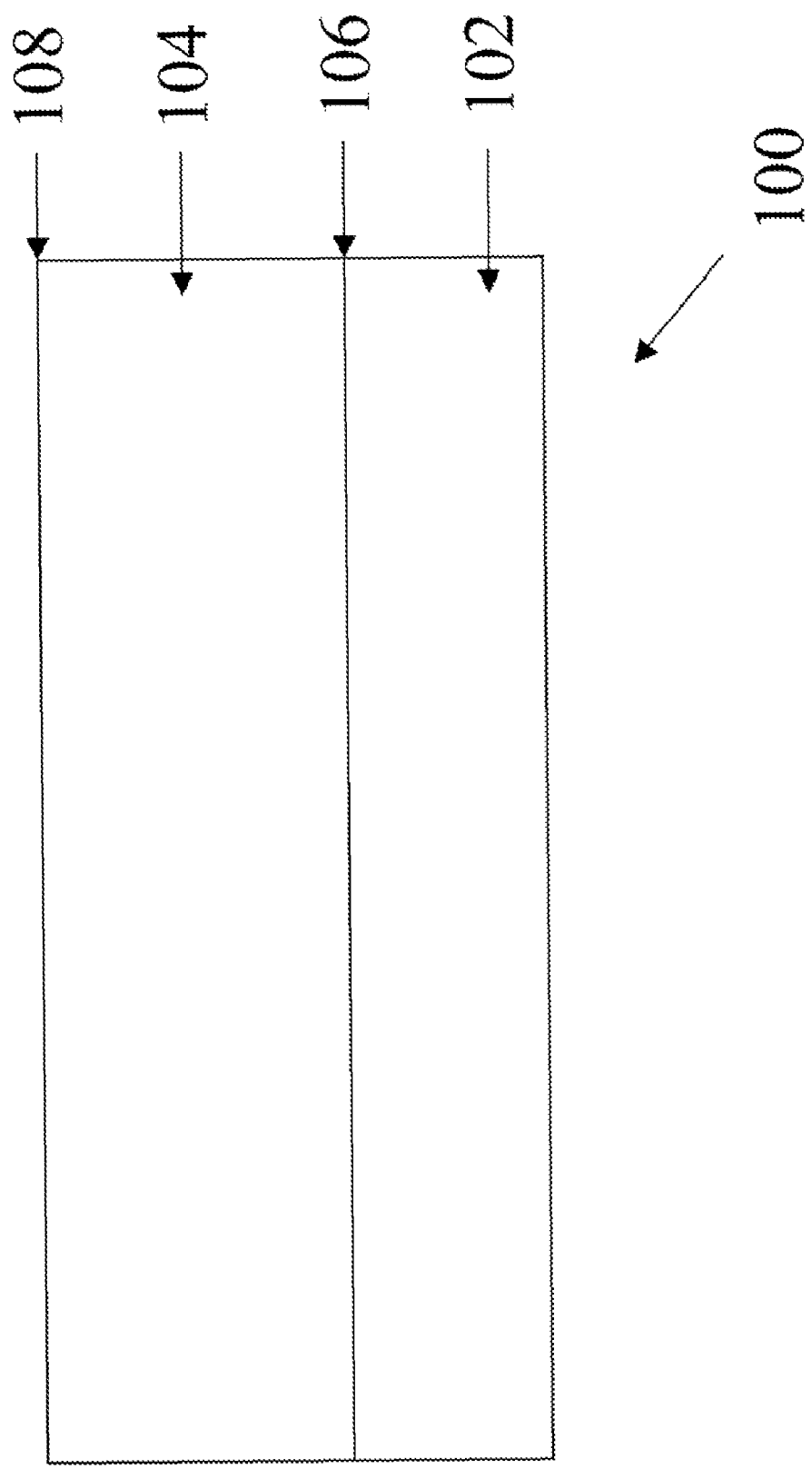

Navias, "Preparation and Properties of Spinel Made by Vapor Transport and Diffusion in the System MgO-Al2O3", Journal of the American Ceramic Society, vol. 44, No. 9, pp. 434-446, Sep. 1961.

Niihara, "New Design Concept of Structural Ceramics", Journal of the Ceramic Society of Japan, Int. Edition, vol. 99, No. 10, pp. 945-952, 1991.

Ohji et al., "Strengthening and Toughening Mechanisms of Ceramic Nanocomposites", Journal of the American Ceramic Society, vol. 81, No. 6, pp. 1453-1460, 1998.

Ortiz-Merino et al., "Relationship Between Wear Rate, Surface Pullout and Microstructure During Abrasive Wear of Alumina and Alumina/SiC Nanocomposites", Acta Materialia, vol. 53, pp. 3345-3357, 2005.

Patscheider, "Nanocomposite Hard Coatings for Wear Protection", MRS Bulletin, pp. 180-183, Mar. 2003.

Voevodin et al., "Supertough Wear-Resistant Coatings With 'Chameleon' Surface Adaptation", Thin Solid Films, vol. 370, pp. 223-231, 2000.

Pezzotti et al., "Strengthening Mechanisms in Al2O3/SiC Nanocomposites", Computational Mateials Science, vol. 22, pp. 155-168, 2001.

Rodriguez et al., Sliding Wear of Alumina/Silicon Carbide Nanocomposites, Journal of American Ceramics Society, vol. 82, No. 8, pp. 2252-2254, Aug. 1999.

Sawaguchi et al., "Mechanical and Electrical Properties of Silicon Nitride-Silicon Carbide Nanocomposite Material", Journal of American Ceramics Society, vol. 74, No. 5, pp. 1142-1144, May 1991.

Slack, "Advanced Materials for Optical Windows", Technical Information Series, pp. 1-45, Manuscript received Feb. 28, 1979.

Taya et al., "Toughening of a Particulate-Reinforced Ceramic-Matrix Composite by Thermal Residual Stress", Journal of American Ceramics Society, vol. 73, No. 5, pp. 1382-1391, May 1990.

Voevodin et al., "Tribological Properties of Adaptive Nanocomposite Coatings Made of Yttria Stabilized Zirconia and Gold", Surace and Coatings Technology, vols. 146-147, pp. 351-356, 2001.

Voevodin et al., "Nanocomposite Tribological Coatings With "Chameleon" Surface Adaptation", J. Vac. Sci. Technol. A, vol. 20, No. 4, pp. 1434-1444, Jul./Agu. 2002.

Yamada et al., "B4C-CrB2 Composites With Improved Mechanical Properties", Journal of the European Ceramic Society, vol. 23, pp. 561-565, 2003.

Zhang et al., "Optical Transmittance of Antireflective Diamond-Like Coatings on ZnS Substrates", Surface and Coatings Technology, vol. 82, pp. 110-113, 1996.

Zhang et al., "Influence of Deposition Parameters on the Refractive Index and Growth Rate of Diamond-Like Carbon Films", Surface and Coatings Technology, vol. 64, pp. 127-130, 1994.

Martinu et al., Plasma Deposition of Optical Films and Coatings: A Review, Review Article, J. Vac. Sci. Technol. A, vol. 18, No. 6, pp. 2619-2645, Nov./Dec. 2000.

Co-pending U.S. Appl. No. 11/634,592, filed Dec. 6, 2006, entitled "Nano-Composite IR Window and Method for Making Same".

* cited by examiner

ROBUST WINDOW FOR INFRARED ENERGY

BACKGROUND

The invention relates generally to transparent nano-composite materials and their production. More specifically, the invention relates to the production and use of a substrate coated with a transparent, wear resistant coating, including, for example, structures suitable for use in windows for optically guided armaments.

Many modern armaments use optical guidance systems to acquire and intercept their targets. Such systems often use an optical tracking system based on receiving infrared energy, often in the mid-infrared region at wavelengths around three to five micrometers. Examples of such systems include air-to-air, heat-seeking guided missiles, and smart munitions such as guided bombs that track a target by laser back scatter. In all of these devices, it is necessary to protect the relatively fragile optical tracking systems from heat and impact events. Protection of the optics requires the use of a highly impact-resistant window that is suitably transparent in the mid infrared region.

Missile window and dome materials are subject to extreme conditions of sand erosion and water droplet impact. They must be able to withstand this erosion and mechanical loading while at the same time be highly transmitting to infrared radiation. Sapphire (a single crystal form of alpha aluminum oxide) is one of the most frequently used materials for this application, but it is susceptible to damage from these impact and erosion mechanisms, as are several other materials suitable for use in these applications.

Therefore there is a need for new material systems and designs that provide the required combination of impact and erosion resistance, mechanical strength, and transparency to infrared radiation.

SUMMARY OF THE INVENTION

Embodiments of the present invention address these and other needs. One embodiment is an article comprising a substrate and a composite coating disposed over the substrate and extending from an interface with the substrate to an external surface. The coating and the substrate are capable of transmitting infrared radiation. The composite coating comprises a first phase and a second phase, where the second phase has a higher resistance to erosive wear than the first phase. The coating comprises a compositional gradient proceeding from a first composition at the interface of the coating with the substrate to a second composition at the external surface, the first composition comprising a higher concentration of the first phase than that of the second composition. The first phase has at least one property selected from the group consisting of a) a coefficient of thermal expansion (CTE) that is within about plus or minus 3 parts per million per degree centigrade of a CTE of the substrate, and b) an index of refraction that is within a range from as high as about 0.1 plus the index of refraction of the substrate to as low as about the square root of the index of refraction of the substrate.

Another embodiment is an article comprising a composite substrate and a composite coating disposed over the substrate. The substrate comprises a matrix material and particles of a nano-dispersoid dispersed within the matrix material, wherein the particles of the nano-dispersoid are less than about 100 nm in at least one dimension. The coating comprises a first phase and a second phase, as above, and is compositionally graded as in the embodiment described above. The first phase comprises a material selected from the group consisting of magnesium aluminate spinel, yttrium aluminate garnet, cubic zirconium oxide, yttrium oxide, magnesium oxide, alpha aluminum oxide, aluminum oxynitride, and rare earth oxides. The second phase comprises a material selected from the group consisting of cubic boron nitride, silicon carbide, silicon nitride, diamond-like carbon, diamond, and boron phosphide. The coating and substrate together cause scattering of up to about 5% of incident infrared radiation.

DRAWINGS

Figure 2:
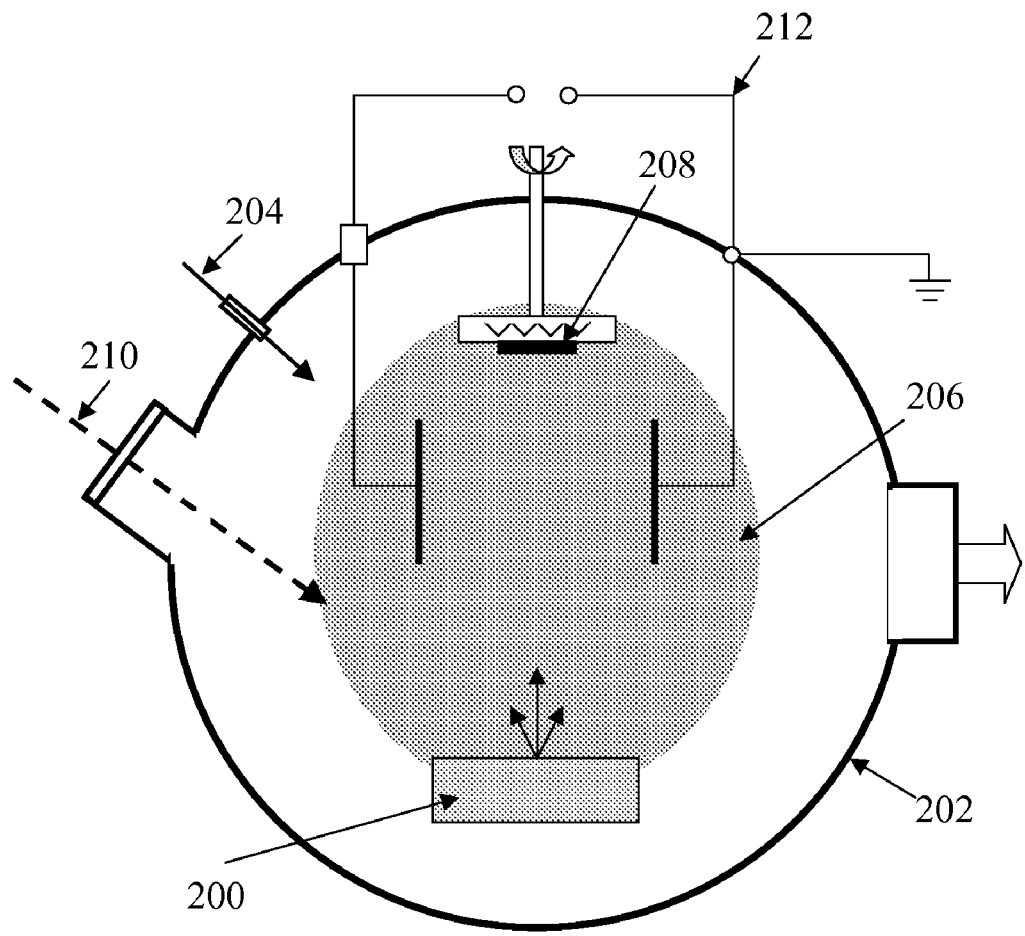

These and other features, aspects, and advantages of the present invention will become better understood when the following detailed description is read with reference to the accompanying drawings in which like characters represent like parts throughout the drawings, wherein:

FIG. 1 is a schematic cross-section of an article according to an exemplary embodiment of the present invention; and FIG. 2 is a schematic illustration of a hybrid coating apparatus.

DETAILED DESCRIPTION

According to the exemplary embodiment illustrated in FIG. 1, an article 100 comprises a substrate 102 and a composite coating 104 disposed over substrate 102. Coating 104 and substrate are capable of transmitting infrared radiation; examples of different embodiments include those where article 100 is a window or a lens used for transmitting infrared radiation, such as a dome or nose cone on missiles and other ordnance. In some embodiments, the infrared radiation transmitted has a wavelength in the range from about 3 micrometers to about 5 micrometers. Coating 104 extends from an interface 106 with substrate 102 to an external surface 108, and is made of at least two phases, where one phase is more resistant to erosive wear than the other phase. Moreover, coating 104 is compositionally graded such that the more wear-resistant phase is present at surface 108 at a higher concentration than its concentration at interface 106. This configuration provides several attractive mechanical and optical advantages, as will be discussed in more detail below.

Substrate 102 is typically a material having a high degree of transparency for infrared radiation. Additionally, substrate 102 generally exhibits a high level of strength and thermal shock resistance. Examples of suitable materials for substrate 102 include, without limitation, glass, magnesium aluminate spinel, yttrium aluminate garnet, cubic zirconium oxide, yttrium oxide, magnesium oxide, alpha aluminum oxide, aluminum oxynitride, and rare earth oxides. Substrate 102 can be made entirely of one or more of these materials, or other materials may be present in addition to these exemplary materials so long as the presence of the other materials do not detract from the optical or mechanical properties of the substrate to a point below a predetermined operational specification.

Substrate 102 can be monolithic or a composite material. Examples of particularly suitable composite materials include those described in U.S. patent application Ser. No. 11/634,592, the contents of which are incorporated by reference in their entirety. In one embodiment, the composite comprises a matrix material and particles of a nano-dispersoid. These nano-dispersoid particles are less than about 100 nanometers (nm) in at least one dimension. Materials described above as suitable for use in substrate 102 are also suitable for use as the matrix material. The size and material of the particles are typically selected for their ability to mechanically reinforce the matrix without unduly detracting from the transmittance properties of the matrix by scattering or absorption. Suitable materials for use as the nano-dispersoid particles in a composite substrate include without limitation cubic boron nitride, silicon carbide, and silicon nitride.

Coating 104 is a composite comprising a first phase and a second phase. The first phase is selected to be optically and/or mechanically compatible with the substrate. Mechanical compatibility in this context means that thermal stresses generated due to differences in respective coefficients of thermal expansion of the substrate 102 and coating 104 are maintained at levels below which spalling of the coating readily occurs. Optical compatibility in this context means that the optical properties of the substrate 102 and coating 104 are not so different as to unduly hamper the transmission of infrared radiation through the coating/substrate configuration. Accordingly, the first phase has (a) a coefficient of thermal expansion (CTE) that is within about plus or minus 3 parts per million per degree centigrade of a CTE of the substrate; or (b) an index of refraction that is within a range from as high as about 0.1 plus the index of refraction of the substrate to as low as about the square root of the index of refraction of the substrate; or both (a) and (b). Examples of first phase materials include without limitation many of the materials noted above as examples of substrate material, such as magnesium aluminate spinel, yttrium aluminate garnet, cubic zirconium oxide, yttrium oxide, magnesium oxide, alpha aluminum oxide, aluminum oxynitride, and rare earth oxides. In some embodiments, the first phase is identical to material used in forming substrate 102, for example as the matrix material where substrate 102 is a composite material. To avoid significant losses due to scattering, in some embodiments the particles of the first phase are less than about 100 nm in at least one dimension. In particular embodiments, the first phase particles are less than about 50 nanometers in at least one dimension.

The second phase in coating 104 has a higher resistance to erosive wear than the first phase. Examples of second phase materials include, but are not limited to, cubic boron nitride, silicon carbide, silicon nitride, diamond-like carbon, diamond, and boron phosphide. In some embodiments, the second phase is present in coating 104 as a plurality of particles. To avoid significant losses due to scattering, in some embodiments the particles of the second phase are less than about 100 nm in at least one dimension. In particular embodiments, the second phase particles are less than about 50 nanometers in at least one dimension.

Generally, the materials suitable for use as the second phase have thermal expansion coefficients sufficiently different from that of the substrate material so that a monolithic coating of the second phase material would create a high risk of spallation due to thermal stresses. Moreover, many erosion-resistant materials lack the overall combination of optical and mechanical properties suitable for use in many infrared window applications.

To address the shortcomings noted above, coating 104 is compositionally graded. The compositional gradient of coating 104 is configured to continuously proceed from a first composition at the interface 106 of the coating with the substrate 102 to a second composition at the external surface 108, with the composition of the coating 104 changing as a function of position between these two endpoints. The first composition has a higher concentration of first phase, and a lower concentration of second phase, than does the second composition. This gradient configuration advantageously allows a relatively high concentration of the second phase (the wear-resistant phase) to be present at the surface 108 where article 100 is exposed to impinging sand, water droplets, and other potentially damaging material. At the same time, the higher concentration of the first phase at interface 106, and its gradual change with distance away from interface, promotes mechanical and optical compatibility with substrate 102, thereby maintaining at acceptable levels thermal stresses and infrared transmission losses attributable to the presence of the second phase.

In some embodiments, the second composition comprises up to about 15 volume percent, and in certain embodiments up to about 10 volume percent, of the first phase, and at least about 85 volume percent, and in some embodiments at least about 90 volume percent, of the second phase. Furthermore, in some embodiments the first composition comprises at least about 85 volume percent, and in certain embodiments at least about 90 volume percent, of the first phase, and up to about 15 volume percent, and in certain embodiments up to about 10 percent, of the second phase. In a particular embodiment, the first composition comprises at least about 85 volume percent first phase and up to about 15 volume percent of the second phase and the second composition comprises up to about 15 volume percent first phase and at least about 85 volume percent of the second phase.

The thickness of coating 104 represents a balance between the required mechanical and optical characteristics of the resultant article 100. For example, considerations of erosive wear drive the desired thickness to higher values, while optical considerations (such as absorption and scattering) and processing limitations drive the desired thickness to lower values. In some embodiments, coating 104 thickness is in the range from about 0.5 micrometers to about 200 micrometers; in certain embodiments, this range is from about 2 micrometers to about 30 micrometers.

Many applications for articles of the present invention and the like that are capable of transmitting infrared radiation require a low degree of scattering and/or absorption to maintain high levels of in-line transmittance. Proper design and materials selection in accordance with the above will often be required to meet these specifications. In some embodiments, the coating and substrate together cause scattering of up to about 5%, and in some embodiments up to 0.5%, of incident infrared radiation. In certain embodiments, the coating and substrate have a combined infrared absorption coefficient of less than about 0.5 per centimeter (0.5 cm$^{-1}$), and in particular embodiments this coefficient is less than about 0.1 cm$^{-1}$.

It will be apparent that certain features described for embodiments of the present invention may be combined to more fully exploit the advantages described above. For example, an embodiment of the article of the present invention includes the composite substrate 102 with nano-dispersoids disposed within the matrix material residing beneath the graded composite coating 104, wherein the coating and substrate together cause scattering of up to about 5% of incident infrared radiation. The materials selection alternatives for substrate 102 and coating 104 are as described previously.

Substrate 102 may be fabricated using methods known in the art of optical ceramic processing. Methods for making composite substrates are described in the aforementioned U.S. patent application Ser. No. 11/634,592. Coating 104 may be fabricated using coating processes that are capable of producing optical quality films, including, but not limited to, physical vapor deposition (PVD), such as ion beam assisted deposition (IBAD), magnetron sputtering (MS), filtered cathodic arc deposition (FCAD) and pulsed laser deposition (PLD); chemical vapor deposition (CVD), such as plasma enhanced CVD (PECVD) and atomic layer deposition (ALD); and hybrid deposition methods, which combine various complementary processes, such as PVD/PECVD and MS/PLD.

Techniques for making functionally graded, nano-structured coatings using the above techniques are known in the art and generally involve controlling the processing parameters as a function of time to gradually change the composition of the coating as its thickness increases. See for example, Martinu and Poitras, *J. Vac. Sci. Technol.* A 18(6), November/December 2000. For processes where the source of the coating material is a solid, such as in sputtering, the power directed to the target may be controlled to manipulate the rate at which material is liberated from the target (and thus condensed onto the substrate). Where the source of the coating material is a gas or liquid, such as in chemical vapor deposition, the flow rate and/or pressure may be controlled to manipulate the rate at which the material is deposited. Where methods use plasma to assist in the deposition process, controlling the ion energy and ion flux of the plasma by, for instance, controlling the power to the plasma generator is often used to control the rate at which active coating species are generated and deposited on the substrate surface. Adjustment of the ion energy and ion flux during film growth can also affect film structure (such as the material packing density) and properties on the nanometer scale. By employing multiple sources and controlling the relative rates of deposition as a function of time, the coating composition can be changed as desired as a function of thickness.

As a non-limiting example of the above, as depicted schematically in FIG. 2, a hybrid PVD/PECVD process is used to deposit a graded nanocomposite coating made of alpha aluminum oxide and silicon carbide. A solid target 200 of alpha aluminum oxide is used in a pulsed laser deposition process in one part of a processing chamber 202, while in another part of the chamber 202, commonly known silicon and carbon precursors 204 are injected into a plasma 206 in a PECVD process to deposit silicon carbide. A substrate 208 is situated at a point in the chamber where coating species generated by both the PVD process and the PECVD process can condense on the substrate surface. The rate of aluminum oxide deposition may be controlled by the power directed to the laser 210, which ablates material from the target 200 at a rate that depends in large part on the power of the laser pulse striking the target. The rate of silicon carbide deposition may be controlled by the power directed to a plasma generator 212, such as a microwave plasma source or a pulsed/modulated RF plasma source, used in the PECVD portion of the hybrid process. The relative rates of deposition of the aluminum oxide and silicon carbide coating components can be determined as a function of the described process parameters. These parameters then may be manipulated during the deposition process so that at first, the rate of aluminum oxide deposition significantly exceeds that of the silicon carbide to provide a coating that has a high level of aluminum oxide relative to silicon carbide at the interface with the substrate. As the process proceeds, the laser power may be diminished gradually and/or the power to the plasma generator may be increased gradually to increase the rate of silicon carbide deposition relative to that of aluminum oxide deposition, thereby creating a gradient in silicon carbide composition where the silicon carbide content increases with distance away from the substrate interface. The outer surface of the coating may be rich in erosion-resistant silicon carbide, with a smooth transition to the more alumina-rich material at the substrate interface.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article comprising:
   a substrate; and
   a composite coating disposed over the substrate and extending from an interface with the substrate to an external surface, the composite coating comprising a first phase and a second phase, the second phase having a higher resistance to erosive wear than the first phase;
   wherein the coating comprises a compositional gradient proceeding from a first composition at the interface of the coating with the substrate to a second composition at the external surface, the first composition comprising a higher concentration of the first phase than that of the second composition;
   wherein the first phase has at least one property selected from the group consisting of
   a) a coefficient of thermal expansion (CTE) that is within about plus or minus 3 parts per million per degree centigrade of a CTE of the substrate, and
   b) an index of refraction that is within a range from as high as about 0.1 plus the index of refraction of the substrate to as low as about the square root of the index of refraction of the substrate;
   wherein the coating and the substrate are capable of transmitting infrared radiation.

2. The article of claim 1, wherein the second composition comprises up to about 15 volume percent of the first phase and at least about 85 volume percent of the second phase.

3. The article of claim 1, wherein the second composition comprises up to about 10 volume percent of the first phase and at least about 90 volume percent of the second phase.

4. The article of claim 1, wherein the first composition comprises at least about 85 volume percent of the first phase and up to about 15 volume percent of the second phase.

5. The article of claim 4, wherein the second composition comprises up to about 15 volume percent of the first phase and at least about 85 volume percent of the second phase.

6. The article of claim 1, wherein the first phase comprises a material selected from the group consisting of magnesium aluminate spinel, yttrium aluminate garnet, cubic zirconium oxide, yttrium oxide, magnesium oxide, alpha aluminum oxide, aluminum oxynitride, and rare earth oxides.

7. The article of claim 1, wherein the second phase comprises a material selected from the group consisting of cubic boron nitride, silicon carbide, silicon nitride, diamond-like carbon, diamond, and boron phosphide.

8. The article of claim 1, wherein the substrate comprises a material selected from the group consisting of glass, magnesium aluminate spinel, yttrium aluminate garnet, cubic zirconium oxide, yttrium oxide, magnesium oxide, alpha aluminum oxide, aluminum oxynitride, and rare earth oxides.

9. The article of claim 1, wherein the substrate comprises a composite material.

10. The article of claim 9, wherein the composite comprises a matrix material and particles of a nano-dispersoid, wherein the particles of the nano-dispersoid are less than about 100 nm in at least one dimension.

11. The article of claim 10, wherein the matrix material is selected from the group consisting of magnesium aluminate spinet, yttrium aluminate garnet, cubic zirconium oxide, yttrium oxide, magnesium oxide, alpha aluminum oxide, aluminum oxynitride, rare earth oxides, and combinations thereof.

12. The article of claim 10, wherein the particles of the nano-dispersoid comprise a material selected from the group consisting of cubic boron nitride, silicon carbide, and silicon nitride.

13. The article of claim 1, wherein the second phase is present as a plurality of particles dispersed in the first phase, wherein the particles of the second phase are less than about 100 nm in at least one dimension.

14. The article of claim 1, wherein the coating has a thickness in the range from about 0.5 micrometers to about 200 micrometers.

15. The article of claim 14, wherein the thickness is in the range from about 2 micrometers to about 30 micrometers.

16. The article of claim 1, wherein the article is an infrared dome or a nose cone.

17. The article of claim 1, wherein the article is a window or a lens.

18. The article of claim 1, wherein the coating and substrate together cause scattering of up to about 5 percent of incident infrared radiation.

19. The article of claim 1, wherein the coating and substrate together cause scattering of up to about 0.5 percent of incident infrared radiation.

20. The article of claim 1, wherein the coating and substrate have a combined infrared absorption coefficient of less than about 0.5 per centimeter.

21. The article of claim 1, wherein the coating and substrate have a combined infrared absorption coefficient of less than about 0.1 per centimeter.

22. An article comprising:
   a composite substrate comprising a matrix material and particles of a nano-dispersoid dispersed within the matrix material, wherein the particles of the nano-dispersoid are less than about 100 nm in at least one dimension; and
   a composite coating disposed over the substrate and extending from an interface with the substrate to an external surface, the composite coating comprising a first phase and a second phase, the second phase having a higher resistance to erosive wear than the first phase;
   wherein the coating comprises a compositional gradient proceeding from a first composition at the interface of the coating with the substrate to a second composition at the external surface, the first composition comprising a higher concentration of the first phase than that of the second composition;
   wherein the first phase comprises a material selected from the group consisting of magnesium aluminate spinel, yttrium aluminate garnet, cubic zirconium oxide, yttrium oxide, magnesium oxide, alpha aluminum oxide, aluminum oxynitride, and rare earth oxides;
   wherein the second phase comprises a material selected from the group consisting of cubic boron nitride, silicon carbide, silicon nitride, diamond-like carbon, diamond, and boron phosphide;
   wherein the coating and substrate together cause scattering of up to about 5 percent of incident infrared radiation.

23. The article of claim 22, wherein the matrix material is selected from the group consisting of $MgAl_2O_4$, $Y_3Al_5O_{12}$, cubic-$ZrO_2$, $Y_2O_3$, MgO, and combinations thereof, and wherein the particles of the nano-dispersoid comprise a material selected from the group consisting of cubic boron nitride, silicon carbide, and silicon nitride.

* * * * *

UNITED STATES PATENT AND TRADEMARK OFFICE
CERTIFICATE OF CORRECTION

| | | |
|---|---|---|
| PATENT NO. | : 7,978,402 B2 | |
| APPLICATION NO. | : 11/769913 | |
| DATED | : July 12, 2011 | |
| INVENTOR(S) | : Sweeney et al. | |

It is certified that error appears in the above-identified patent and that said Letters Patent is hereby corrected as shown below:

In Column 6, Line 64, in Claim 11, delete "spinet," and insert -- spinel, --, therefor.

Signed and Sealed this
Twenty-seventh Day of September, 2011

David J. Kappos
*Director of the United States Patent and Trademark Office*